United States Patent
Plondke et al.

(10) Patent No.: US 7,398,371 B2
(45) Date of Patent: Jul. 8, 2008

(54) SHARED TRANSLATION LOOK-ASIDE BUFFER AND METHOD

(75) Inventors: Erich Plondke, Austin, TX (US);
William C. Anderson, Austin, TX (US);
Lucian Codrescu, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 296 days.

(21) Appl. No.: 11/165,757

(22) Filed: Jun. 23, 2005

(65) Prior Publication Data

US 2006/0294341 A1 Dec. 28, 2006

(51) Int. Cl.
*G06F 12/00* (2006.01)
*G06F 13/24* (2006.01)

(52) U.S. Cl. .................. 711/207; 710/260; 712/228; 712/244

(58) Field of Classification Search .................. 711/207
See application file for complete search history.

(56) References Cited

U.S. PATENT DOCUMENTS

| | | | |
|---|---|---|---|
| 5,224,210 A * | 6/1993 | Pinedo et al. ............... | 345/501 |
| 6,049,867 A * | 4/2000 | Eickemeyer et al. ........ | 712/228 |
| 6,088,788 A * | 7/2000 | Borkenhagen et al. ...... | 712/205 |
| 6,233,599 B1 * | 5/2001 | Nation et al. ................ | 718/102 |
| 6,438,650 B1 * | 8/2002 | Quach et al. ................. | 711/118 |
| 6,766,435 B1 * | 7/2004 | Aglietti et al. ............... | 711/209 |
| 2004/0025161 A1* | 2/2004 | Chauvel et al. ............. | 718/102 |
| 2004/0064654 A1 | 4/2004 | Willis et al. | |
| 2004/0162971 A1 | 8/2004 | Joy et al. | |
| 2004/0187117 A1 | 9/2004 | Orion et al. | |
| 2005/0080970 A1* | 4/2005 | Jeyasingh et al. ........... | 710/266 |

FOREIGN PATENT DOCUMENTS

WO        9744732 A1    11/1997

* cited by examiner

*Primary Examiner*—Matt Kim
*Assistant Examiner*—Michael C Krofcheck
(74) *Attorney, Agent, or Firm*—Thomas Rouse; Nicholas J. Pauley; Joseph B. Agusta

(57) ABSTRACT

A shared translation look-aside buffer method comprises saving data stored in a first selected set of registers to a predetermined section of a thread-specific area in memory upon encountering an exception/interrupt, re-enabling exceptions and optionally interrupts, addressing a cause of the exception/interrupt while safely permitting another exception, and restoring the saved data to the first selected set of registers.

9 Claims, 4 Drawing Sheets

SHARED TRANSLATION LOOK-ASIDE BUFFER AND METHOD

BACKGROUND

I. Field of the Invention

The present disclosure pertains generally to the field of processors, and more specifically to a shared translation look-aside buffer and method.

II. Background

A translation look-aside buffer (TLB) is a cache used to store recently used virtual-to-physical address translations. When a processor needs to access a memory location indicated by a virtual address, it asks the translation look-aside buffer for the corresponding physical address for the memory location. If the translation look-aside buffer contains the given virtual address, it is a "hit" and the processor is provided the corresponding physical address. When the given virtual address is not in the translation look-aside buffer, it is a "miss" and the processor must search or "walk" the page table for the corresponding physical address. The physical address is then provided or "filled" to the translation look-aside buffer. However, in the case of a shared translation look-aside buffer between multiple processor threads, the address translation for another thread may get "evicted" by the present thread. In some critical operating system operations, this may result in severe errors.

Translation look-aside buffer misses may be handled in software or hardware. However, using hardware to fill translation look-aside buffer entries in case of a translation look-aside buffer miss exception requires specialized hardware that is infrequently used. In some processor implementations, shadow registers are used to save some register contents automatically during exception or interrupt handling. Translation look-aside buffer misses may be handled automatically by the hardware, or may cause an exception and be handled by software. Because interrupts, exceptions and translation look-aside buffer misses are infrequent, having dedicated hardware resources is undesirable because of the increase in complexity and a less efficient design.

In some processors, software is used to handle translation look-aside buffer misses. In case of a translation look-aside buffer miss, software is used to walk the page table entries for the virtual-to-physical address translation. In these processors, a translation look-aside buffer is provided for each central processing unit (CPU) or each processing thread to avoid the problem of another processor or thread changing the translation look-aside buffer entries. However, because it is costly and inefficient to provide a translation look-aside buffer per thread, it is also not practicable in some applications.

SUMMARY

In an embodiment of the disclosure, a method comprises saving data stored in a first selected set of registers to a predetermined section of a thread-specific area in memory upon encountering an exception/interrupt, re-enabling exceptions and optionally interrupts, addressing a cause of the exception/interrupt while safely permitting another exception, and restoring the saved data to the first selected set of registers.

In another embodiment, a processor comprises a software-managed translation look-aside buffer shared between a plurality of processing threads, and a virtual memory having a first predetermined section of the thread-specific area for temporary storage of data during non-translation look-aside buffer miss exception handling, and at least one second predetermined section of the thread-specific area for temporary storage of data during translation look-aside buffer miss exception handling.

In yet another embodiment, a processor having a shared translation look-aside buffer comprises means for saving data stored in a first selected set of registers to a predetermined section of a thread-specific area in memory upon encountering an exception/interrupt, means for re-enabling exceptions and optionally interrupts, means for addressing a cause of the exception/interrupt while safely permitting another exception, and means for restoring the saved data to the first selected set of registers.

In another embodiment of the disclosure, a computer-readable medium having encoded thereon a method comprises saving data stored in a first selected set of registers to a predetermined section of a thread-specific area in memory upon encountering an exception/interrupt, re-enabling exceptions and optionally interrupts, addressing a cause of the exception/interrupt while safely permitting another exception, and restoring the saved data to the first selected set of registers.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DESCRIPTION OF SPECIFIC EMBODIMENTS

For cost and power considerations, it may be desirable to use a shared translation look-aside buffer among multiple processing threads. However, the management of a software-programmed shared translation look-aside buffer (TLB) is not a trivial matter.

Figure 1:
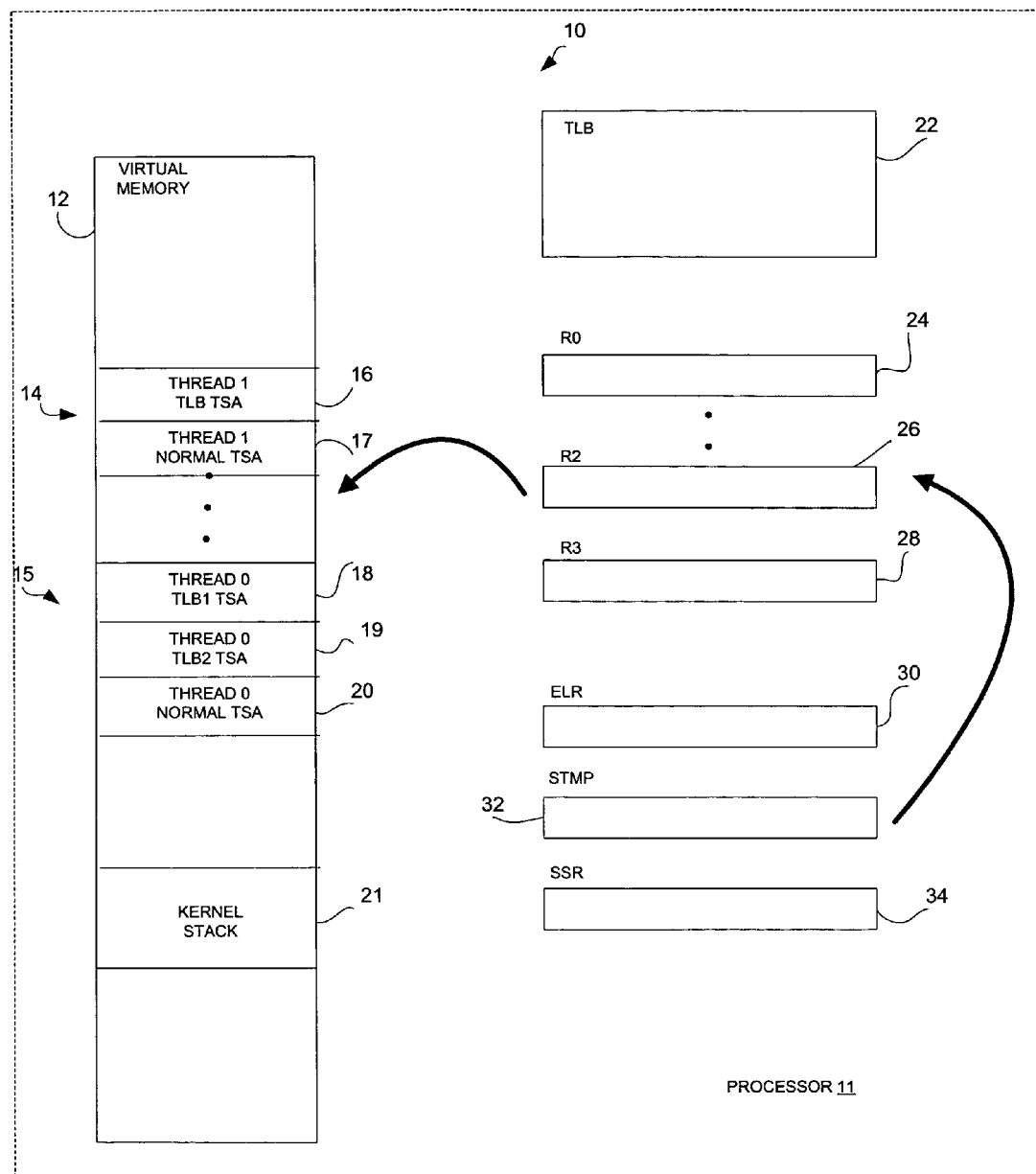
FIG. 1 is a simplified logical block diagrams of an embodiment of a portion of the memory system of a processor.

FIG. 1 is a simplified logical block diagrams of an embodiment of a portion of a memory system 10 of a processor 11. The processor 11 may be a general-purpose microprocessor or a specialized processor such as a digital signal processor (DSP), for example. The memory system 10 comprises memory locations 12 used to store data, instruction code, and other data. In one embodiment of the memory system 10, a section of memory called a thread-specific area (TSA) (14 and 15) is defined for each processing thread. Each TSA 14 and 15 comprises a normal section and at least one TLB section. The TLB TSA section is devoted to the temporary storage of data during the process of handling TLB miss exceptions. For example, the TSA 14 for thread 1 includes a TLB TSA section 16 and a normal TSA section 17. In another embodiment, the TSA may include more than one TLB section. For example, the TSA 15 for thread 0 is shown to include two TLB TSA sections 18 and 19, and a normal TSA section 20. As described in more detail below, the two TLB TSA sections are used to temporarily store data for two nesting TLB miss exceptions. By software convention, the physical address for the TSA is always stored in the TLB and is therefore always translatable.

The memory system 10 may include additional TSA sections not shown explicitly herein. By convention, the virtual-to-physical translation of the TSAs are never evicted from the TLB 22. The memory system 10 also comprises general purpose registers (GPRs) R0 24, R2 26, and R3 28. Additionally, the memory system 10 comprises supervisor special registers that are only used during the supervisor mode. A supervisor special register called an exception link register (ELR) 30 is used to store the return address after exception or interrupt handling is completed, and another supervisor special register called supervisor temporary or STMP 32 is used for temporary storage. Another register called supervisor status register (SSR) 34 is used to hold status information such as the reason for the exception or interrupt.

A hardware constraint of the memory system 10 shown in FIG. 1 is that the general purpose registers, R0-R3, for example, have to be used as an intermediate data storage when moving data to and from ELR, SSR, STMP and the kernel stack. It should be understood that the memory system 10 typically contains other memory components but are not described herein for the sake of brevity and clarity. Referring to the description below in conjunction with FIGS. 2-4, the utility of these components of the memory system 10 will be described in more detail.

Figure 2:
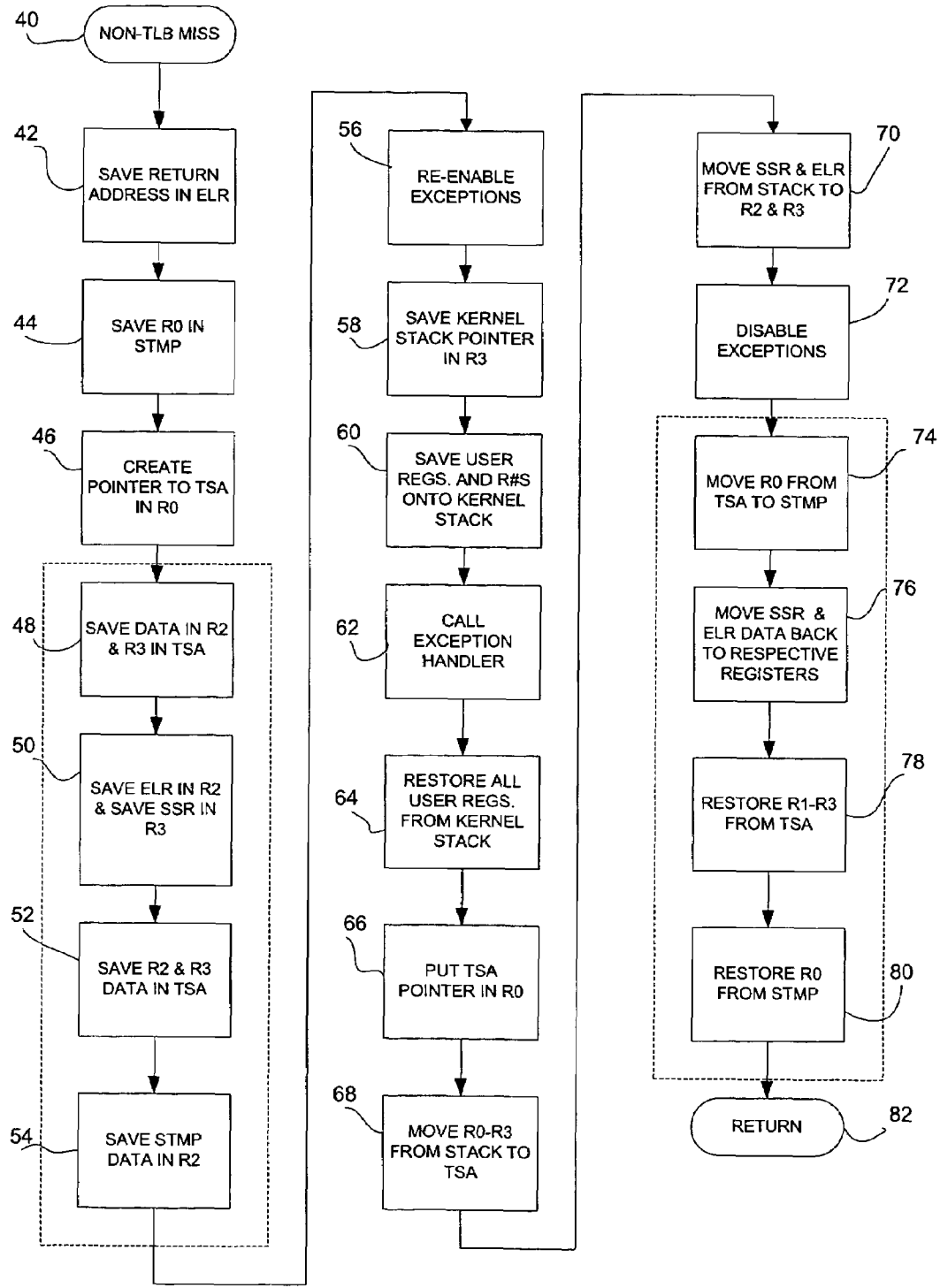
FIG. 2 is a simplified flowchart of an embodiment of a method of handling non-translation look-aside buffer miss exceptions and interrupts.

FIG. 2 is a simplified flowchart of an embodiment of a method 40 of handling non-TLB miss exceptions and interrupts. References may be made from time-to-time to memory system components shown in FIG. 1. When an exception or interrupt occurs, the processor execution transitions from a user mode to a supervisor mode. In step 42, the return address is saved in the ELR 30 and status information is saved in the SSR 34. In step 44, the contents of the general purpose register R0 24 is preserved in the temporary register STMP 32 so that R0 can be used for other purposes. In step 46, a pointer to the TSA is created and saved in R0. The TSA sections are identified by their processing thread ID. In the following steps, context data, user data and other data are saved in the appropriate areas of the normal TSA section, and the general purpose registers are used to pass data out of these registers and into the TSA. In step 48, the data in the general purpose registers R2 26 and R3 28 are saved in the TSA so that R2 and R3 can be used to transfer data out of the ELR 30, STMP 32 and SSR 34. In step 50, the contents of the ELR 30, which is the return address, and the contents of the SSR 34 are moved to R2 and R3, respectively. In step 52, the contents of R2 and R3 are again saved in the appropriate locations in the TSA. In step 54, the data stored in the STMP 32, which is the data that was in R0, is moved to R2. In step 56, exceptions are now allowed to occur or enabled. During this step, R3 may be used to manipulate and/or change selected bits of status data in the SSR 34, for example. A TLB miss exception, if it were to occur now, would not result in loss of critical data. In step 58, the kernel stack pointer is stored in R3. In step 60, context data in the user registers such as general purpose registers and other registers, including the data temporarily saved in the TSA, are stored onto the kernel stack 21 using the kernel stack pointer stored in R3. Prior to re-enabling exceptions in step 56, writing to and reading from the kernel stack 21 may cause an exception, with data that are not yet safe guarded. Therefore, the TSA is used to temporarily hold the register data prior to re-enabling exceptions and then pushed onto the kernel stack 21 after re-enabling exceptions. After the re-enabling of exceptions, because the contents of the TSA may be altered by another software thread if the operating system switches to a new software thread before returning to the current software thread, the register data stored in the TSA and other necessary data are stored in the kernel stack 21 where they will remain accessible and unaltered. In step 62, the code for an exception handler is called.

After the completion of the exception handler, register data are restored. The data from all user registers, except R0-R3, are restored from the kernel stack in step 64. In step 66, the pointer to the TSA is stored in R0. In step 68, the general purpose register data saved in the kernel stack are now moved to the TSA via R0-R3. In step 70, the data from the SSR and ELR are moved from the kernel stack to R2 and R3, respectively. The exceptions are then disabled in step 72 so that there cannot be an occurrence of a TLB miss exception. In step 74, the R0 data is moved from the TSA to the STMP. In step 76, the SSR and ELR data are restored back to the respective registers from R2 and R3. In step 78, the R1-R3 data are restored from data in the TSA. The R0 data is also restored from STMP in step 80. At this point all the data that were in the user registers, general purpose registers, and the ELR and SSR registers are restored to their original locations when the exception occurred. Therefore, execution may return to the return address stored in the ELR in step 82.

Figure 3:
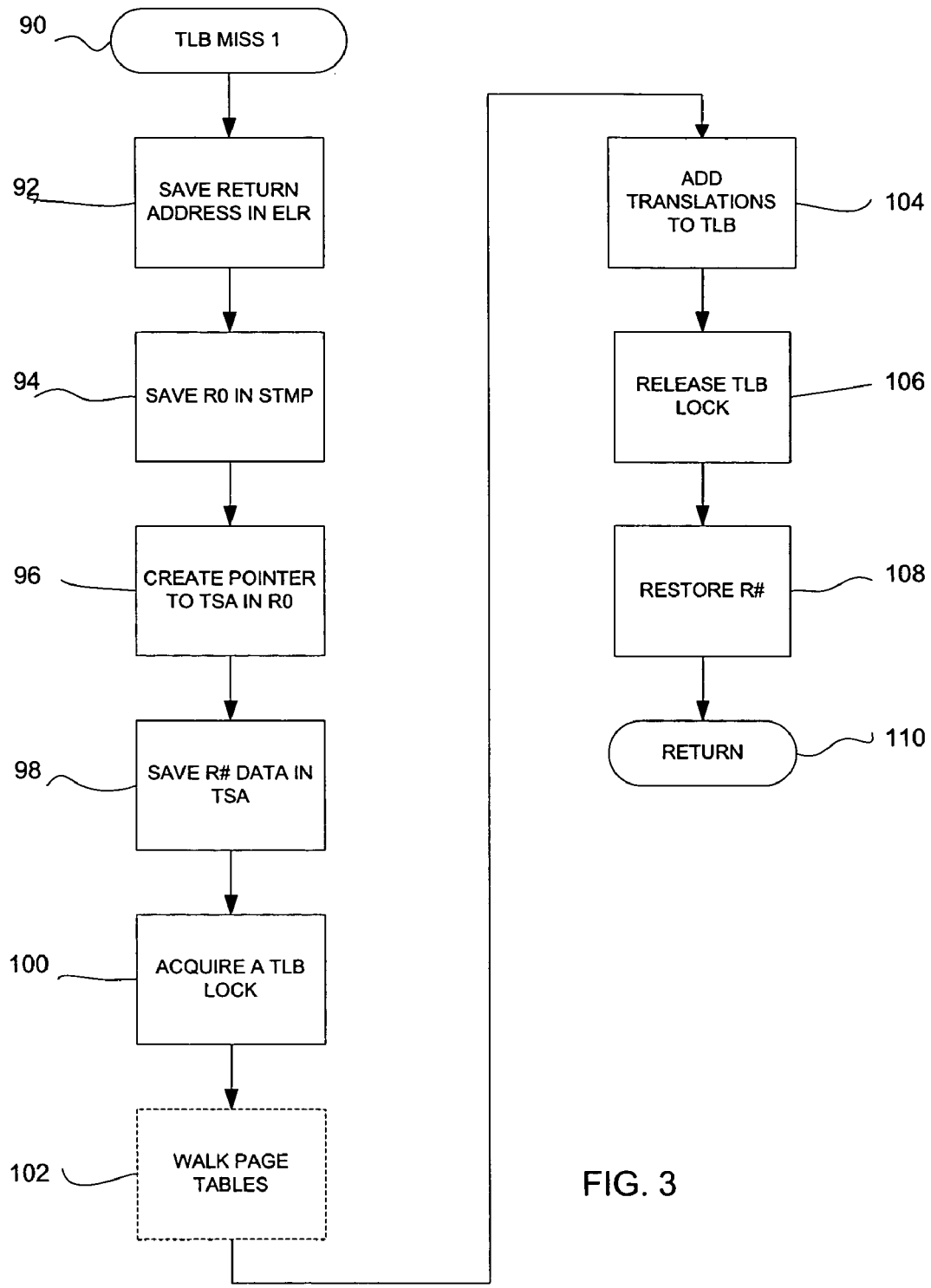
FIG. 3 is a simplified flowchart of a first embodiment of a method of handling translation look-aside buffer miss exceptions and interrupts.

FIG. 3 is a simplified flowchart of a first embodiment of a method 90 of handling TLB miss exceptions and interrupts. References are also made to FIG. 1 for the components of memory system 10. In step 92, the address of the instruction to return to upon completion of exception handling is stored in the ELR 30. In step 94, the contents of R0 24 are stored in the STMP 32. In step 96, a pointer to the TSA is created in R0. In step 98, the data in the general purpose registers are saved in the TSA. More specifically the data are stored in the TLB TSA section as specified or indexed by the thread identifier. In this step, only enough of the data required to service the exception are needed to be saved. In step 100, a lock to prevent any other processing thread from altering the TLB 22 is acquired. In steps 102 and 104, the page tables are "walked" to obtain the missing virtual-to-physical address translation and add it to the TLB 22. Because other processing threads are not allowed to alter the TLB 22, the updated entries to the TLB 22 is "guaranteed" to remain in the TLB 22. Step 102 may be optional because some physical addresses may be derived from the virtual address by some operation, for example, adding a constant to the virtual address, so that a page walk may not be necessary. In step 106, the lock is released. In step 108, the contents of the general purpose registers are restored from the TSA. Execution then returns in step 110.

Figure 4:
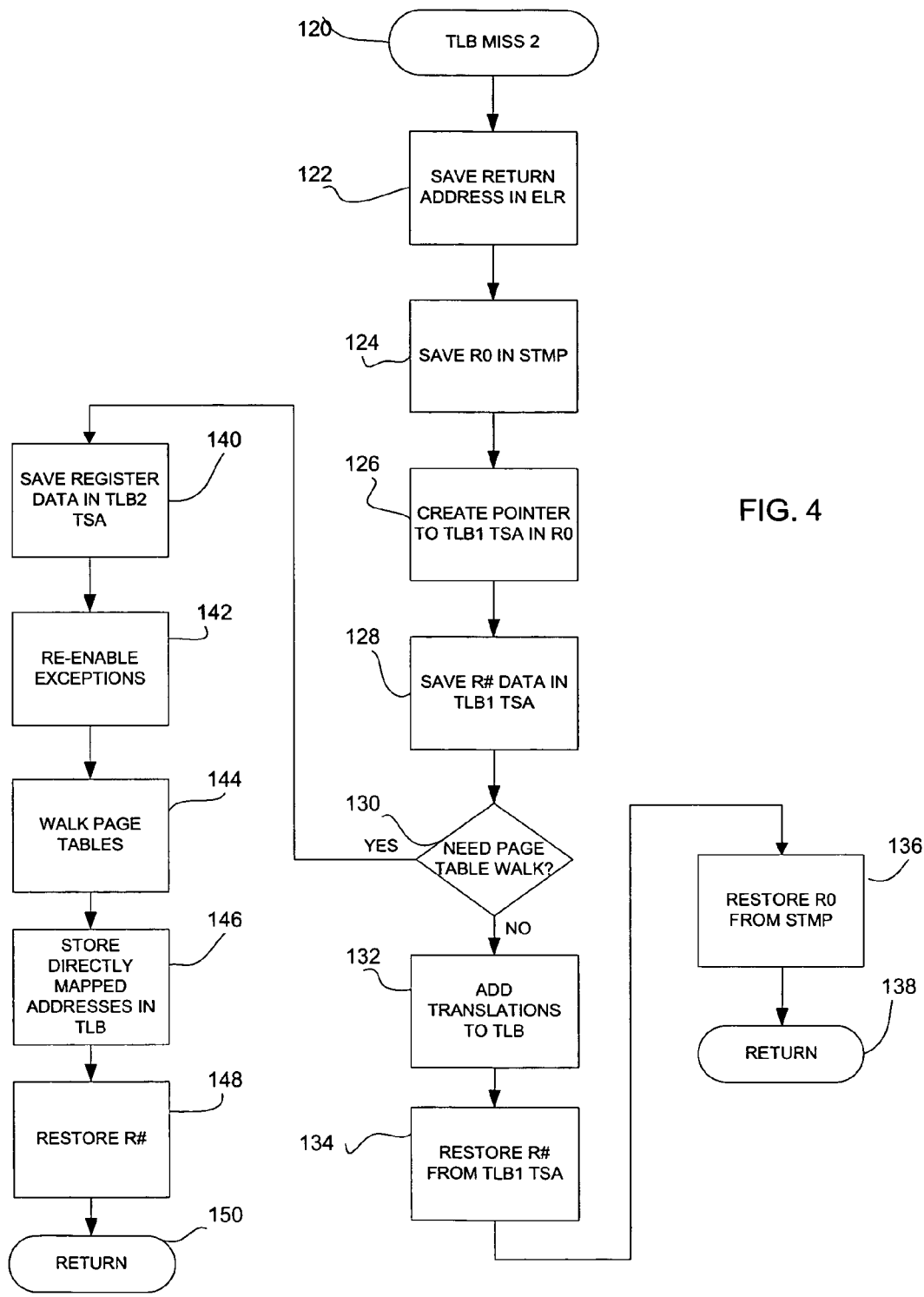
FIG. 4 is a simplified flowchart of a second embodiment of a method of handling translation look-aside buffer miss exceptions and interrupts.

FIG. 4 is a simplified flowchart of a second embodiment of a method 120 of handling TLB miss exceptions and interrupts. References are also made to FIG. 1 for the components of memory system 10. In step 122, the address of the instruction to return to upon completion of exception handling is stored in the ELR 30. In step 124, the contents of R0 24 are stored in the STMP 32. In step 126, a pointer to the TSA is created in R0. In step 128, the data in the general purpose registers are saved in the TSA. More specifically the data are stored in a first TLB section of the TSA (TLB1 TSA) as specified by the thread identifier. In this step, only enough of the data required to service the exception are needed to be saved. In step 130, a determination is made as to whether a page table walk is needed to obtain the virtual-to-physical address translation. If a page table walk is not required, then the physical address may be somehow derived from the virtual address, and the corresponding physical address is derived and added to the TLB 22 in step 132. In step 134, the data from the general purpose registers are restored from the TSA TLB1 section. In step 136, R0 is restored from the STMP 32. Execution then returns in step 138.

If in step 130 it is determined that a page table walk is needed to obtain the physical address, then in step 140 more data are saved in the TLB1 TSA, such as SSR, ELR, and other register data. Step 140 is performed to save "enough" data to service the exception and may be an optional step depending on application. In step 142, exceptions are re-enabled. It should be noted that if a second TLB miss exception occurs, the general purpose register data are saved in the second TLB section of the TSA (TLB2 TSA), which is logically separate from the TLB1 TSA used to store data from the first TLB miss exception. In this example, a maximum of two nesting TLB miss exceptions are permitted. However it should be noted that an arbitrary number of nested TLB miss exceptions may be supported by creating an arbitrary number of logically distinct TLB TSA sections. In steps 144, a page table walk is performed to read virtual addresses that can be mapped to physical addresses directly without any additional page table walk. This limitation is applied to avoid another TLB miss exception or more than two nested TLB exceptions. The TLB is updated with new translated address entries in step 146. In step 148, the general purpose registers are restored with data stored in the TLB TSA. In step 150, the execution returns.

It should be noted that depending on the hardware implementation, the methods described above may be optimized. For example, in systems with more than one supervisor temporary registers, they may be used to streamline the steps to move data from the general purpose registers to the TSA. Further, certain systems may provide the capability to swap register contents rather than use two or more consecutive save or move instructions. Other optimization methods may be available to achieve the desired goals of the methods described above and are contemplated herein. It should be understood that the description above making use of specific registers is merely provided as concrete examples and that variations on the methods described above are contemplated herein.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. A method comprising:
   upon encountering an exception/interrupt, saving data stored in a first selected set of registers to a thread-specific area of a virtual memory, the thread-specific area having a corresponding physical address stored in a translation look-aside buffer, wherein the data stored in the first selected set of registers is saved to a predetermined section of the thread-specific area, wherein saving data to the predetermined section of the thread-specific area comprises saving data to a first predetermined section of the thread-specific area for temporary storage of data during handling of translation look-aside buffer misses when the encountered exception/interrupt is a first translation look-aside buffer miss exception;
   re-enabling exceptions and optionally interrupts;
   addressing a cause of the exception/interrupt while safely permitting another exception;
   restoring the saved data to the first selected set of registers;
   encountering a second translation look-aside buffer miss exception associated with a same thread as the first translation look-aside buffer miss exception while the cause of the first translation look-aside buffer miss exception is being addressed; and
   saving data stored in the first selected set of registers to a second predetermined section of the thread-specific area that is devoted to the temporary storage of data while handling a nested translation look-aside buffer miss exception.

2. The method of claim 1, further comprising:
   saving data stored in the predetermined section of the thread-specific area and data stored in a second selected set of registers to a kernel stack;
   restoring the saved data to the second selected sets of registers from the kernel stack;
   moving data corresponding to the first set of registers from the kernel stack to the predetermined section of the thread-specific area;
   disabling exceptions and interrupts; and
   restoring data corresponding to the first set of registers from the predetermined section of the thread-specific area to the first set of registers.

3. The method of claim 1, wherein encountering the exception/interrupt comprises encountering a translation look-aside buffer miss exception.

4. The method of claim 1, wherein addressing the cause of the exception/interrupt comprises updating the translation look-aside buffer with a new translation entry.

5. The method of claim 1, wherein addressing the cause of the exception/interrupt comprises calling an exception handler.

6. The method of claim 1, further comprising:
   saving data from general purpose registers to the predetermined section of the thread-specific area;
   moving data from supervisor special registers to the general purpose registers; and
   saving the moved data from the general purpose registers to the predetermined section of the thread-specific area.

7. The method of claim 1, wherein saving data to the predetermined section of the thread-specific area comprises saving data to the predetermined section of the thread-specific area as indexed by a thread identifier.

8. The method of claim 1, wherein saving data to the predetermined section of the thread-specific area comprises saving data to a predetermined section of the thread-specific area devoted to temporary data storage during exception handling.

9. The method of claim 1, wherein saving data to the predetermined section of the thread-specific area comprises saving data to a predetermined section of the thread-specific area devoted to temporary data storage during translation look-aside buffer miss exception handling.

\* \* \* \* \*